United States Patent [19]

Berard et al.

[11] Patent Number: 5,085,717
[45] Date of Patent: Feb. 4, 1992

[54] AUTOPYROLYZABLE COMPOSITION FOR AEROBIC PROPULSION, THE OXIDIZING AGENT OF WHICH IS AN EXPLOSIVE

[76] Inventors: Jean-Daniel M. Berard, 6, rue de la Sorbonne, 75005 Paris; Bernard E. Finck, 8, rue Léopold Vandries, 91100 Corbeil Essonnes; Gérard Doriath, 19, avenue du Midi, 91760 Itteville; Christian M. Perut, 7c, avenue du Bois Chapet, 91540 Mennecy, all of France

[21] Appl. No.: 178,541

[22] Filed: Jul. 29, 1980

[30] Foreign Application Priority Data

Aug. 14, 1979 [FR] France .................. 79 20728

[51] Int. Cl.⁵ .............................................. C06B 45/10
[52] U.S. Cl. ...................... 149/19.9; 60/207; 60/219
[58] Field of Search .............. 60/207, 219; 149/19.9

[56] References Cited

U.S. PATENT DOCUMENTS

| | | |
|---|---|---|
| 2,926,613 | 3/1960 | Fox .................................. 149/87 |
| 3,309,249 | 3/1967 | Allen ............................. 149/19.91 |
| 3,650,855 | 3/1972 | MacKenzie ....................... 149/19.9 |
| 3,668,872 | 6/1972 | Comp ................................ 60/207 |
| 3,761,330 | 9/1973 | Lou et al. ........................... 149/21 |
| 3,791,140 | 2/1974 | Rudy et al. ........................ 60/219 |
| 3,946,555 | 3/1976 | Goede ................................ 60/207 |
| 3,986,909 | 10/1976 | Macri ............................. 149/19.9 |
| 4,133,173 | 1/1979 | Schadow ............................ 60/207 |
| 4,332,631 | 6/1982 | Herty et al. ..................... 149/19.2 |
| 4,420,931 | 12/1983 | Anderson ........................... 60/219 |

Primary Examiner—Edward A. Miller
Attorney, Agent, or Firm—Cushman, Darby & Cushman

[57] ABSTRACT

An autopyrolyzable solid composition for aerobic propulsion consists essentially of an oxidizing agent, a binder and a crosslinking agent. The oxidizing agent is a nitrated explosive material wherein the amount, by weight, of oxygen atoms fixed to the nitrogen atoms of the nitrate groups exceeds 40 percent relative to the total weight of the molecule. The binder is a polyalkadiene having functional terminal groups, such as —OH or —COOH groups, reactive with the crosslinking agent which can have isocyanate, epoxy or aziridinyl functions.

12 Claims, 1 Drawing Sheet

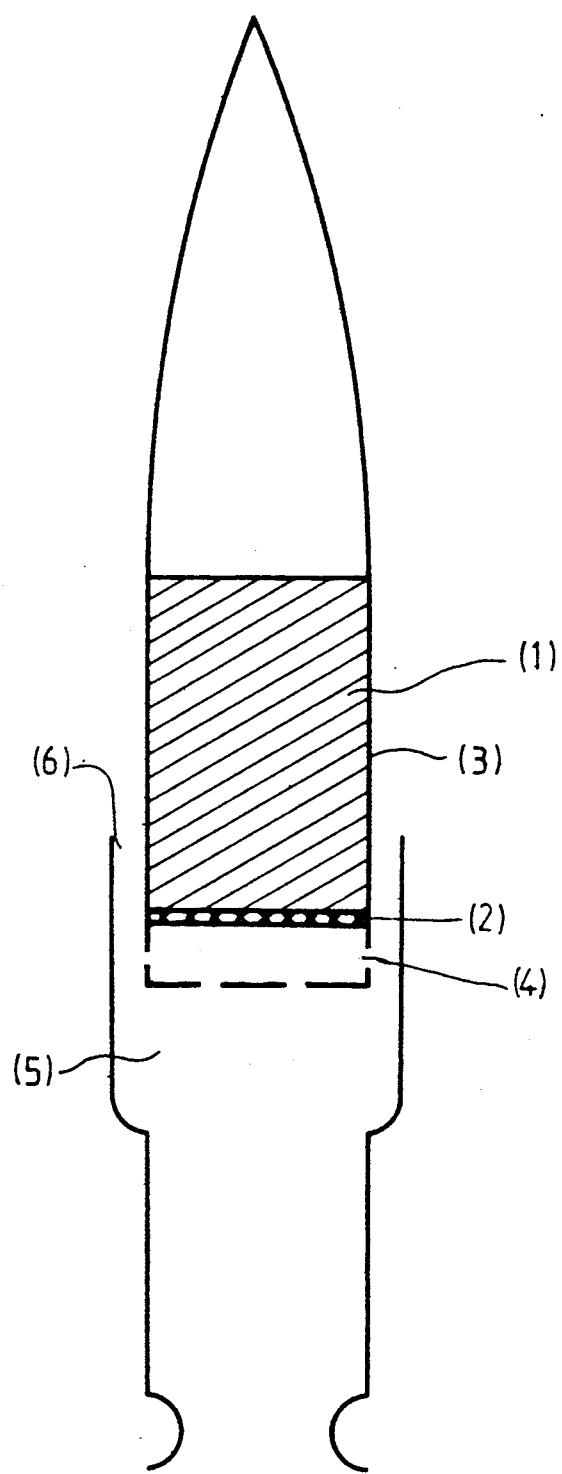

AUTOPYROLYZABLE COMPOSITION FOR AEROBIC PROPULSION, THE OXIDIZING AGENT OF WHICH IS AN EXPLOSIVE

This invention relates to an autopyrolyzable solid composition for aerobic propulsion, said composition generating reducing gases upon autopyrolysis, and consisting essentially of an oxidizer, a binder, at least one cross-linking agent as well as to the use of said composition in ramjet engines.

BACKGROUND OF THE INVENTION

It is known that a ramjet, like any other aerobic engine, includes at least one combustion chamber supplied (1) with fuel from a fuel source and (2) an oxidizing agent from air, derived from the ambient atmosphere through at least one ram air inlet, the combustion products being ejected through at least one exhaust nozzle.

For a ramjet to effectively operate, especially as concerns the compression of the combustion air, the aircraft on which it is installed must be moving at a relatively high speed, such as speed being obtained notably by equipping said aircraft with an acceleration propellant grain incorporated or not into the ramjet combustion chamber or by launching from a carrier airplane or a carrier rocket which, themselves, reach the required speed.

Furthermore, it is known to be advantageous for assisting the combustion development and efficiency within a ramjet combustion chamber to distribute as much as possible the fuel in said chamber, this concern having led to the design of a range of ramjets using a liquid fuel, such as kerosene for instance, which is then injected in sprayed form into the ramjet chamber.

The ramjets pertaining to this range, called "liquid fuel ramjet", are undeniably advantageous from the performance standpoint but due to the use of a liquid fuel phase they show some operational difficulties because of the leaks which may occur. Besides, the liquid phase must be pressure-injected thereby increasing the system complexity while reducing its reliability.

In order to cope with these difficulties, it has been proposed to implement another ramjet family, the fuel phase of which is restricted to a solid phase.

This technique can be applied, for instance, by placing the solid fuel phase into the ramjet combustion chamber.

Using a special generator, it is also possible to convert this solid fuel phase into a gaseous fuel phase which is then gradually delivered in said combustion chamber. In the latter case, it is necessary to provide the ramjet with a combustible gas generator using an autopyrolyzable solid composition for the production of such gases.

Solid propellant compositions consisting essentially of a high amount of an oxidizing agent and a weakly oxygenated binder are already known.

U.S. Pat. No. 3,087,844 and 3,883,375, for instance, describe composite solid propellant compositions consisting of a polyalkadiene having functional terminal groups hardened by a triaziridine phosphine oxide and oxidizing agent such as ammonium perchlorate.

These compositions however are difficult to use in aerobic propulsion because they are finely balanced in oxygen and release therefore few reducing gases thus leading to poor performance. In addition, due to the presence of ammonium perchlorate, these compositions are liable to emit secondary smokes which impair the discretion.

According to U.S. Pat. No. 3,756,874, propellants are also known, the oxidizing agent of which is a mixture of potassium perchlorate and cyclotetramethylenetetranitramine (HMX).

But once again, such compositions have too rich an oxidizing agent content to be efficiently used in aerobic used propulsion. Furthermore, the binders used, such as epoxy or polyester resins, are too highly oxygenated to obtain the release of sufficient amounts of reducing gases.

In the specific field of aerobic propulsion, it has been proposed as described in U.S. Pat. No. 3,952,505, to make use of a composition containing a mixture of hydroxytelechelic polyalkadiene and one or several aromatic densifying compounds such as pyrenes or anthracenes. This type of composition however is absolutely not autopyrolyzable. In fact, the combustion can only be achieved with the assistance of oxygen from the air.

Thus, for the present application, it is necessary that the solid fuel phase be in the engine combustion chamber in order to provide the combustion.

Besides, there has been proposed in U.S. Pat. No. 3,754,511 a composition consisting of a mixture of reducing compound, such as boron or aluminum and an oxidizing agent such as niter. But this type of composition shows some inconveniences due to implementation problems. In addition, this solution, although tempting from the theoretical standpoint, requires specific configurations and cannot be used for all missions. Also, a discretion of such compositions is less satisfactory thus restricting their operational capabilities.

BRIEF DESCRIPTION OF THE DRAWING

The drawing is a longitudinal cross-sectional view of a ramjet with the composition of the present invention.

SUMMARY OF THE INVENTION

One object of the present invention is to provide an autopyrolyzable composition for aerobic propulsion whose energy, produced by the combustion of a small quantity of oxidizing agent and part of the fuel, is almost fully used for the pyrolysis of the remaining binder while creating the formation of a porous carbonaceous residue; the latter gradually replaces the solid composition and constitutes a thermal shield and a thermal reflector for maintaining the combustion.

Another object of the invention is to provide an autopyrolyzable solid composition whose pyrolysis will release the reducing gases making up the gaseous fuel burned in contact with the air.

Another object of the present invention is to provide a discrete autopyrolyzable composition, in other words, a composition which, upon combustion, releases little or no smoke at all. It is known that such discretion is very important for military applications in order to minimize the location possibilities of the propelled aircraft.

According to this invention, the autopyrolyzable solid composition for aerobic propulsion, which generate reducing gases upon its autopyrolysis, basically consists of an oxidizing agent, a binder and a cross-linking agent and is further characterized in that:

the oxidizing agent is a nitrated explosive material wherein the amount, by weight, of oxygen atoms fixed to the nitrogen atoms of the nitrated groups exceeds 40% with respect to the total weight of the molecule;

the binder is a polyalkadiene having with reactive functional terminal groups vis-a-vis the cross-linking agent, and in that the weight of oxidizing is equal to or higher than the minimum amount of oxidizing agent required for causing autopyrolsysis of the composition, and less than 40% relative to the total weight of the oxidizing agent, binder and cross-linking agent.

Every oxidizing agent is characterized by a weight limit below which the oxidizing agent can no longer provide autopyrolysis of the binder.

It was found that among the oxidizing agents capable of providing autopyrolysis of the binder, the most interesting were those requiring the smallest quantity of it for maintaining autopyrolysis.

These oxidizing agents are nitrated explosive materials having a an amount, by weight, of oxygen atoms fixed to the nitrogen atoms of the nitrated groups higher than 40%.

For instance, it was unexpectedly found that dinitroglycolurile which contains 42 percent by weight of oxygen atoms, 28% of which is bound to the nitrogen atoms of the nitrated groups, is inappropriate for the present invention because of the too high weights of oxidizing agent required for providing autopyrolysis ($\geq 46\%$).

Among the explosive materials for use according to the invention, the following may be given for reference:
nitramines, particularly cyclotetarmethylenetetranitramine (homocyclonite), cyclotrimethylenetrinitramine, trinitro-2, 4, 6-phenylmethylnitramine;
nitrated aromatic compounds, particularly trinitrotoluene and hexanitrostilbene;
nitric esters, particularly pentaerythrite tetranitrate or pentaerythrol tetranitrate, nitrocellulose.

The grain-size distribution of these explosive materials is advantageously less than $50\mu$ and preferably fine-sized or less than $30\mu$.

The table below shows the minimum weight percent of oxidizing agent to provide autopyrolysis of the composition for various explosives with fine grain-size distribution.

| Type of explosive | Minimum ratio |
| --- | --- |
| Pentaerythrol tetranitrate (PETN) | 18% |
| Cyclotrimethylenetrinitramine (RDX) | 27% |
| Cyclotetramethylenetetranitramine (HMX) | 30% |
| Trinitrotoluene (TNT) | 30% |

It has been found that this minimum amount of oxidizing agent depended in major part on the amount by weight of oxygen atoms bound to the atoms of nitrated groups and that this amount increased as the amount of these same oxygen atoms decreased within the molecule.

By plotting the curve of the minimum amount of oxidizing agent versus the amount of the oxygen atoms bound to the nitrogen atoms of the nitrated groups, those skilled in the art can thus find from the above table the minimum amount corresponding to other explosives.

Such a measurement however can only be approximate because the minimum amount of oxidizing agent is a mean value and because there is no well defined boundary between the amount of oxidizing agent at which the autopyrolysis takes place or not.

The minimum amount of oxidizing agent shall be considered as a mean value within a range from 2 to 3%.

The autopyrolysis of a composition containing a nitrated explosive in an amount corresponding to the minimum amount takes place at a given rate which is furthermore relative to the binder, pressure and temperature. The three latter conditions being maintained constant, it is possible to increase the autopyrolysis rate by increasing the oxidizing agent content.

The oxidizing agent content however shall be less than 40% by weight relative to the total weight of the oxidizing agent, binder and cross-linking agent because the gaseous mixture generated by the pyrolysis of the solid composition shall be as rich as possible in reducing elements (C, H) and as poor as possible in oxidizing elements (O, Cl, N, etc.) since the performance of a ramjet is a function, among other parameters, of the gaseous mixture heating value.

This same criterion also limits the choice of the binder.

In fact, the binder shall be non-oxygenated or at least very weakly oxygenated.

Besides, the binder shall be polymerizable so that it can be mixed with the oxidizing agent in its liquid state, then hardened at a relatively low temperature of about 20° C. to 60° C.

Among the binders meeting the above conditions, preference shall be given to binders containing the reaction product of at least one polyalkadiene whose functionality is advantageously comprised between 1.5 and 3, preferably between 1.9 and 2.5, and of at least one cross-linking agent containing per molecule the number of functions required for hardening the polyalkadiene.

Among the polyalkadienes useful in the present invention, two particularly interesting families can be mentioned, i.e.: the polybutadienes carrying —OH groups on the one hand, and the polybutadienes carrying—COOH groups on the other hand. The first stated polyalkadienes cross-link through reaction with compounds carrying isocyanate functions and the second with compounds carrying epoxy or aziridinyl functions.

Other binders appropriate for the compositions of the present invention are, for instance:
the polyisoprenes carrying at least two reactive groups.

In addition, these polyalkadienes may possibly be enriched with saturated polyolefins, liquid in their production conditions, such as the polyisobutylenes.

Among the binders usable for the compositions of the present invention, preference shall be given to those which give little residue. Among these, there can be mentioned in particular the polybutadienes containing—OH groups reticulated or cross-linked by compounds containing isocyanate functions or the polybutadienes containing—COOH groups reticulated or cross-linked by triaziridinyl phosphine oxide compounds.

Among the compounds containing isocyanate functions, the following can be mentioned: toluene-diisocyanate (TDI), dicyclohexyl methane diisocyanate, diphenylmethane diisocyanate (MDI), hexamethylene diisocyanate and isophorone diisocyanate (IPDI).

The triaziridine compounds which may be used are described in U.S. Pat. 3,883,375, although, preference shall be given to tri 1- (2-methyl) aziridinyl phosphine oxide or MAPO.

In order to obtain the cross-linking, it is known to use a quantity of cross-linking agent between 5 and 20% with respect to the polyolefin quantity.

Highly oxygenated binders such as the diol aliphatic polycarbonates are inappropriate for the compositions of this invention because they form conventional propellants balanced in oxygen and they release, upon their combustion, insufficient amounts of reducing gases.

As previously described, the amount of oxidizing agent present shall not exceed 40% by weight relative to the total weight of oxidizing agent, binder and cross-linking agent.

In the case of pentaerythrite tetranitrate, cyclotrimethylenetrinitramine and cyclotetramethylenetetranitramine, it has been found that the best performance was obtained when using the following amounts of oxidizing agents:
20 ≦ Penterythrol—tetranitrate ≦ 30
30 ≦ Cyclotetramethylenetetranitramine ≦ 35
27 ≦ Cyclotrmiethylenetrinitramine ≦ 35

Although all of the above stated explosives are convenient for this invention, it was found to be particularly advantageous, due to a very low residue ratio, a low combustion velocity and a high volumic specific impulse (Isp), to use pentaerythrol-tetranitrate.

Preferably use shall be made of a pentaerythrol-tetranitrate ratio between 22% and 28% and a carboxytelechelic polybutadiene binder (PBCT) cross-linked by a triaziridine phosphine oxide or a hydroxytelechelic polybutadiene binder (PBHT) hardened by a diisocyanate.

The following is a preferred embodiment of the invention.

In a 30-liter mixer, the binder, without the cross-linking agent, is mixed, followed by the explosive material. The whole is then mixed until completely homogenized. The cross-linking agent is added at the completion of the mixing and the paste is cast by gravity or injection. The composition is then hardened for three days at 50° C.

Of course the sequence observed for introducing the various constituents may vary without departing from the invention.

Because of its autopyrolyzable character, this type of composition is particularly adapted to the ramjet whose generator is independent from the combustion chamber.

The drawing is a longitudinal view in cross-section of a ramjet containing the autopyrolyzable composition of the present invention.

According to this drawing, autopyrolyzable composition (1) with ignition device (2) is placed in a first combustion chamber (3) provided with openings (4) for exhaust gases. The gases released during the autopyrolysis of the composition react in combustion chamber (5) with oxygen from the air which is admitted through inlets (6).

Of course, other configurations may be set up without departing from the invention.

The examples hereunder are given for reference only.

EXAMPLES

The compositions are tested on a grain weighing 1.4 kg and the performance is evaluated on the basis of the following criteria:
combustion velocity (V) in millimeters per second,
residue ratio in weight percent
theoretical specific volumic impulse (Isp) at an internal pressure in the combustion chamber of 5.7 atm in second-gram-cubic centimeter,
specific impulse (Is) in second,
combustion heat (Q) in calorie per gram.

The results obtained for the various compositions tested are given below (together with a comparative test using a composition whose oxidizer is ammonium perchlorate).

| Binder | Reticulant | | | R | Isp | Is | Q |
|---|---|---|---|---|---|---|---|
| Pentaerythrol-tetranitrate (fine grain-size distribution) | | | | | | | |
| | | PETN ratio | Vc at 35 bar | | | | |
| PBCT | MAPO | 22 | 0.4 | 10 ≦ R ≦ 14 | 1,400 | 1,372 | 8,500 |
| PBCT | MAPO | 25 | 0.54 | 11 ≦ R ≦ 14 | | | |
| PBCT | MAPO | 28 | 0.67 | 10 ≦ R ≦ 13 | 1,360 | 1,280 | 8,020 |
| PBHT | IPDI | 28 | 0.67 | 3 ≦ R ≦ 9 | 1,280 | | |
| Cyclonite (fine grain-size distribution) | | | | | | | |
| | | RDX ratio | Vc at 45 bar | | | | |
| PBCT | Epoxy | 30 | 0.97 | 16 | 1,300 | 1,203 | |
| Homocyclonite (fine grain-size distribution) | | | | | | | |
| | | HMX ratio | Vc at 32.5 bar | | | | |
| PBCT | Epoxy | 30 | 0.45 | 16 | 1,318 | 1,209 | |
| TNT (fine grain-size distribution) | | | | | | | |
| | | TNT ratio | Vc at 50 bar | | | | |
| PBCT | Epoxy | 30 | 2.3 | 30 | 1,350 | 1,273 | |

Comparative tests have been performed using ammonium perchlorate so as to show and illustrate the improvements achieved by this invention.

| | | NH$_4$ClO$_4$ (fine grain-size distribution) | | | | | |
|---|---|---|---|---|---|---|---|
| Binder | Cross-linking Agent | NH$_4$ClO$_4$ ratio | Vc at 50 bar | R | Isp | Is | Q |
| PBCT | MAPO | 26 | 0.7 | 7% | 1,260 | 1,160 | 7,100 |

The application to the propulsion of ramjets is illustrated on the composition including 28% of pentaerythrol-tetranitrate and a PBCT binder cross-linked by MAPO.

The tests are performed under the following conditions:

| | |
|---|---|
| diameter of the combustion chamber | 200 mm |
| air pressure inside the chamber | 3.7 bar |
| richness $\frac{\text{(propellant flow)}}{\text{(air flow)}}$ | 0.38 |
| combustion efficiency versus the theoretical value based on the typical velocity | 0.91 |

We claim:

1. An autopyrolyzable, solid organic composition for aerobic propulsion, said composition consisting essentially of a solid oxidizing agent, a binder and at least one cross-linking agent, and generating reducing gases upon autopyrolysis of its components, said solid oxidizing agent being a nitro or nitrate, organic explosive material wherein the amount, by weight, of oxygen atoms bonded to the nitrogen atoms of the said nitro or nitrate groups exceeds 40 percent relative to the total weight of the molecule, said binder being a polyalkadiene having functional terminal groups reactive with said cross-linking agent, and wherein said solid oxidizing agent is present in an amount equal to or higher than the minimum amount of oxidizing agent required for causing autopyrolysis of said composition and less than 40 percent by weight relative to the total weight of said solid oxidizing agent, binder and crosslinking agent.

2. An autopyrolyzable solid composition for aerobic propulsion, said composition consisting essentially of a solid oxidizing agent, a binder and at least one crosslinking agent, and generating reducing gases upon autopyrolysis of its components, said solid oxidizing agent being selected from the group consisting of cyclotetramethylenetetranitramine, cyclotrimethylenetrinitramine, 2,4,6-trinitrophenylmethylnitramine, trinitrotoluene, hexanitrostilbene, pentaerythritol tetranitrate and nitrocellulose, said binder consisting of the reaction product of at least one polyalkadiene having a functionality between 1.5 and 3 and a cross-linking agent containing functional groups reactive with said polyalkadiene, said polyalkadiene being (a) a polybutadiene having —OH groups or (b) a polybutadiene having —COOH groups, said cross-linking agent being a compound having isocyanate functional groups when said polyalkadiene is (a) or a compound having epoxy or aziridinyl functional groups when said polyalkadiene is (b), and wherein the amount, by weight, of oxygen atoms bonded to the nitrogen atoms of the nitrate or nitro groups of said solid oxidizing agent exceeds 40 percent relative to the total weight of the molecule, said solid oxidizing agent being present in an amount ranging from 2 to less than 40 percent by weight based on the total combined weight of said solid oxidizing agent, binder and crosslinking agent.

3. The composition of claim 1 wherein said explosive material is a nitric ester.

4. The composition of claim 3 wherein said nitric ester is pentaerythrol tetranitrate.

5. The composition of claim 4 wherein said pentaerythrol tetranitrate is present in an amount ranging from 20 to 30 weight percent based on the total weight of oxidizing agent, binder and cross-linking agent.

6. The composition of claim 1 wherein said binder comprises the reaction product of at least one polyalkadiene having a functionality between 1.5 and 3 and at least one cross-linking agent.

7. The composition of claim 6 wherein said polyalkadiene is polybutadiene having—OH groups and wherein said cross-linking agent has isocyanate functions.

8. The composition of claim 6 wherein said polyalkadiene is polybutadiene having—COOH groups and wherein said crosslinking agent has epoxy functions.

9. The composition of claim 6 wherein said polyalkadiene is polybutadiene having—COOH groups and wherein said cross-linking agent has aziridinyl functions.

10. The composition of claim 2 wherein when said polyalkadiene is polybutadiene having—OH groups, said cross-linking agent is selected from the group consisting of toluene diisocyanate, dicyclohexylmethane diisocyanate, diphenylmethane diisocyanate, hexamethylene diisocyanate and isophorone diisocyanate.

11. The composition of claim 2 wherein when said polyalkadiene is polybutadiene having—COOH group, said crosslinking agent is tri-1-(2-methyl)aziridinyl phosphine oxide.

12. The composition of claim 2 wherein said oxidizing agent is pentaerythrol tetranitrate present in an amount of about 22-28 weight percent and said binder is carboxytelechelic polybutadiene cross-linked by triaziridine phosphine oxide.

* * * * *

UNITED STATES PATENT AND TRADEMARK OFFICE
CERTIFICATE OF CORRECTION

PATENT NO. : 5,085,717

DATED : February 4, 1992

INVENTOR(S) : Jean Daniel M. BERARD et al

It is certified that error appears in the above-identified patent and that said Letters Patent is hereby corrected as shown below:

On the title page, add the following:

-- [73] Assignee: Societe Nationale Des Poudres Et Explosifs --

Signed and Sealed this

Fifth Day of January, 1993

*Attest:*

DOUGLAS B. COMER

*Attesting Officer*   *Acting Commissioner of Patents and Trademarks*